March 24, 1936.  W. SHAKESPEARE, JR  2,035,279
FISHING REEL
Filed March 21, 1935   2 Sheets-Sheet 1
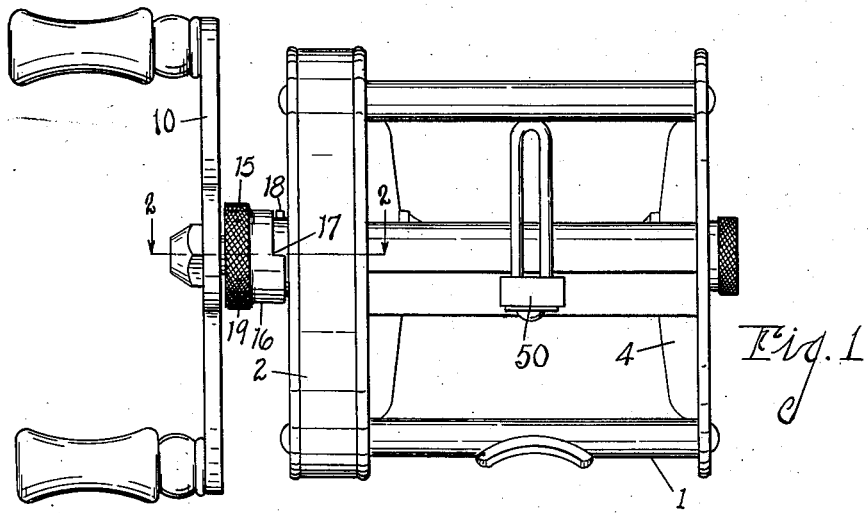
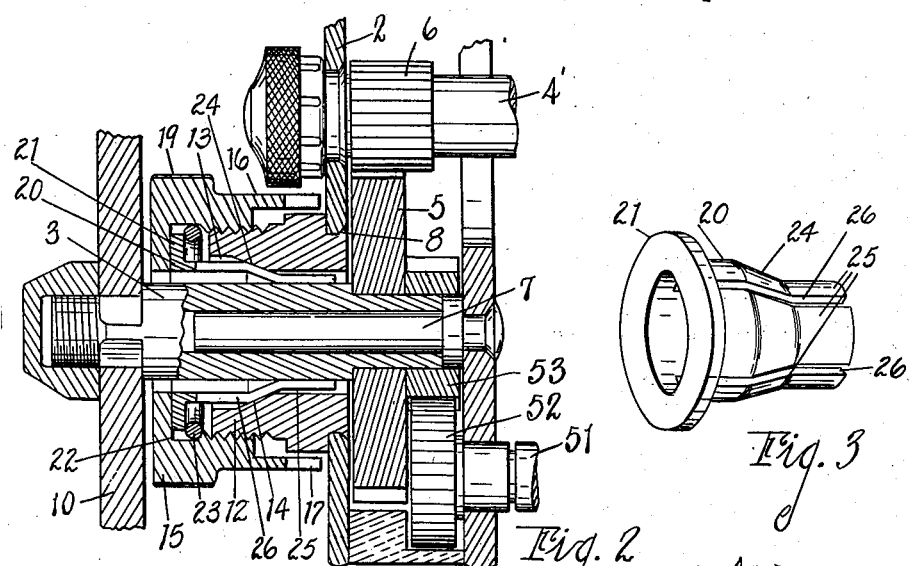
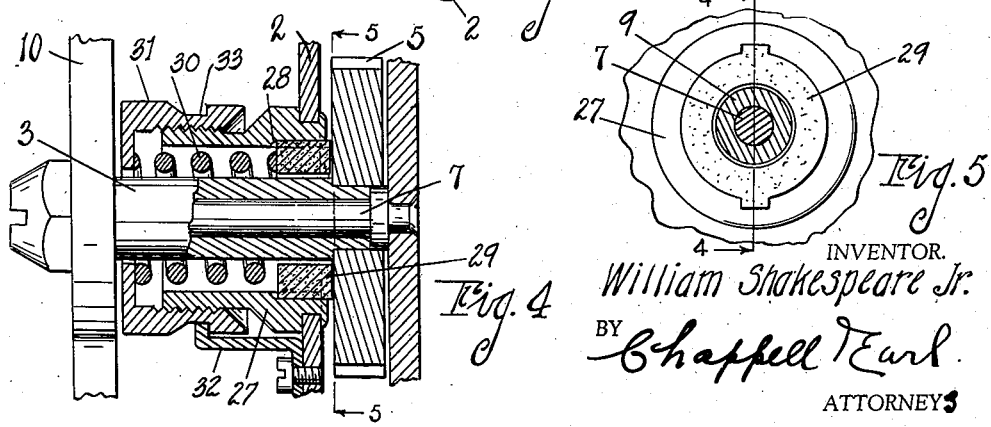
INVENTOR.
William Shakespeare Jr.
BY Chappell Earl
ATTORNEYS Patented Mar. 24, 1936

2,035,279

UNITED STATES PATENT OFFICE 2,035,279

FISHING REEL

William Shakespeare, Jr., Kalamazoo, Mich., assignor to Shakespeare Company, Kalamazoo, Mich.

Application March 21, 1935, Serial No. 12,138

25 Claims. (Cl. 242—84.5)

The main objects of this invention are:

First, to provide in a fishing reel an improved drag or brake means which is very sensitive and capable of easy manipulation for any degree of braking action from its minimum to its maximum.

Second, to provide a drag or brake which is very efficient and at the same time simple and economical in its parts and the parts are so arranged that the strain and wear thereon is minimized.

Third, to provide in a fishing reel an improved brake or drag means having its adjusting means located at the base of the crank.

Fourth, to provide in a fishing reel a brake means which does not tend to distort or displace the spool as the result of the brake means acting upon the spool as is quite common practice in this art.

Objects relating to details and economies of the invention will appear from the description to follow. The invention is defined and pointed out in the claims.

Preferred embodiments of the invention are illustrated in the accompanying drawings, in which:

Fig. 1 is a front elevation of a fishing reel of the level wind type embodying the features of the invention.

Fig. 2 is an enlarged fragmentary view mainly in section on line 2—2 of Fig. 1.

Fig. 3 is a perspective view of the sleeve-like brake member of the embodiment shown in Fig. 2.

Fig. 4 is a fragmentary view mainly in section on a line corresponding to line 4—4 of Fig. 5 of a modified form or embodiment of my invention.

Fig. 5 is a detail view in section on a line corresponding to line 5—5 of Fig. 4.

Figure 6:
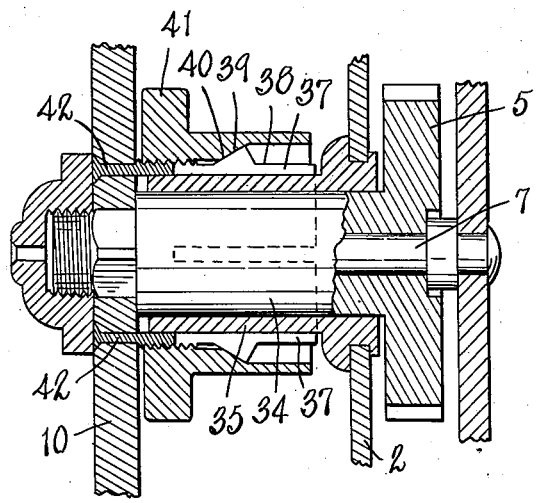
Fig. 6 is an enlarged fragmentary view of another embodiment of my invention.

In the embodiment of the invention illustrated in Figs. 1, 2, and 3 of the drawings, I designates a fishing reel frame which is provided with a chambered head 2. The crank shaft 3 is connected to the shaft 4' of the spool 4 by means of the gear 5 on the crank shaft and the coacting pinion 6 on the spool shaft. The crank shaft 3 is supported by the stub shaft or spindle 7 carried by the inner wall of the head 2, the shaft being tubular to receive the spindle. The outer wall of the head 2 is provided with an opening 8 in which the collar or thimble 12 is secured in concentric relation to the crank shaft.

The bore 13 of this collar 12 is provided with a conical inwardly tapered portion 14. A brake adjusting member 15 is threaded upon the collar and is provided with a flange 16 surrounding the base of the collar. This flange 16 is provided with a pair of spaced stops preferably by forming a segmental notch or recess 17 therein, the ends of which constitute stops coacting with the stop pin 18 on the collar, thereby limiting the rotative movement of the adjusting member. The adjusting member is preferably knurled at 19 to facilitate grasping. It will be noted that it is on the inside and at the center of the base of the crank 10.

Within the adjusting member and collar, I mount a sleeve-like brake member 20 having an outwardly projecting flange 21 at its outer end disposed on the inner side of the inwardly projecting flange 22 on the adjusting member. This brake member has an inwardly tapered or conical portion 24 coacting with the conical portion 14 of the sleeve and the brake member is longitudinally slotted providing a plurality of segmental brake shoes 25. The slots 26 are uniformly spaced so that the shoes are of uniform dimensions and uniformly positioned around the shaft. In the structure illustrated, there are four slots of 90° spacing.

The brake member is retained in assembled relation to the sleeve and to move outwardly with the sleeve by means of the split ring 23 which is snapped into the adjusting member at the inside of the flange 21 of the brake member. With this arrangement, the turning of the adjusting member 15 adjusts the brake and the degree of braking friction, and this adjustment is very sensitive, any degree desired between the minimum and the maximum being readily secured.

It will be noted that the braking action is centered so that there is no side or distorting thrust on the brake parts and that the brake is independent of the spool; that is, there is no braking stress on the spool such as results where one of the spool flanges is used as a brake drum as is quite common practice in fishing reels of this type. The adjusting member is so located that it is very convenient to manipulate.

In the embodiment of my invention shown in

Figs. 4 and 5, the collar 27 is provided with an internal annular recess 28 facing the gear 5 and an annular brake member 29 is splined in this recess for coaction with the side of the gear. This brake member is preferably formed of dense fabric impregnated with graphite and a binder of phenolic condensation product. The adjusting member 31 acts upon this brake member through the coiled spring 30 which is arranged within the collar or thimble and the inwardly projecting flange on the adjusting member. The compression spring acts to resiliently urge the brake member into braking engagement with the gear when the adjusting member is screwed inwardly to the desired extent. The parts are so proportioned that the compression spring is not under stress when the brake adjusting member is in its brake releasing position, as shown in Fig. 4. In this embodiment, the movement of the brake adjusting member is limited by a stop 32 mounted on the outer wall of the head 2 for coaction with the external annular groove or recess 33 in the adjusting member. The stop not only limits the outer movement of the nut but also prevents its being turned off the collar or into jamming relation with the crank. The stop 18 of the embodiment of Figs. 1 to 3 performs the same function of preventing undesired outward movement of the adjusting member or its being brought into jamming or locking relation with the crank.

Figure 7:
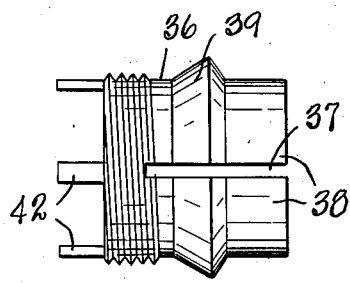
Fig. 7 is a side elevation of the brake member of the embodiment shown in Fig. 6.

In the embodiment shown in Figs. 6 and 7, the crank shaft 34 is not only supported by the spindle 7 but the sleeve or thimble 35 also is preferably arranged to constitute a bearing member. In this embodiment, the brake member 36 coacts with the external surface of the sleeve 35, the brake member being provided with longitudinal slots 37 providing a plurality of segmental brake shoes 38. This brake member has an external conical portion 39 coacting with the internal conical portion 40 of the adjusting member 41. The brake member, in this embodiment, is connected to the crank by means of a series of fingers 42 arranged through and riveted in suitable openings provided therefor in the crank. The adjusting member is threaded upon the brake member so that by rotating the adjusting member the shoes are brought into braking or frictional engagement with the external surface of the collar or sleeve 35.

Figure 8:
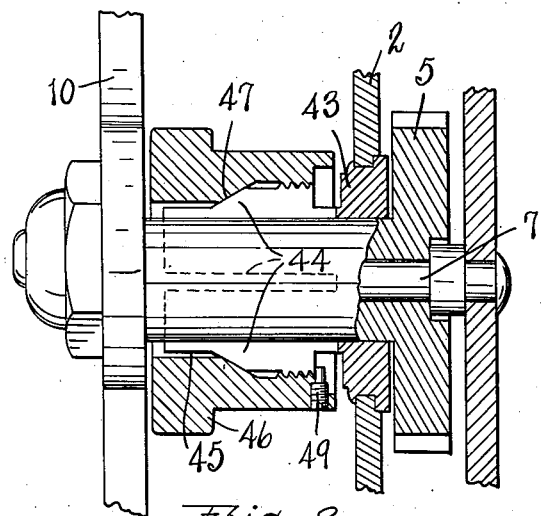
Fig. 8 is an enlarged fragmentary view mainly in section of still another modification or embodiment of the invention.
Figure 9:
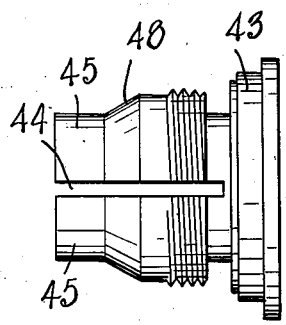
Fig. 9 is a side view of the brake member of the embodiment shown in Fig. 8.

In the embodiment of my invention shown in Figs. 8 and 9, the brake member 43 is mounted on the head 2 in concentric relation to the crank shaft and the outer end of this sleeve is longitudinally slotted at 44 to provide a plurality of segmental brake shoes 45 which in this case coact directly with the shaft. The adjusting member 46 is threaded upon the brake member and the brake member is provided with the outwardly facing conical surface 47 while the adjusting member has a coacting inwardly facing conical surface 48 so that rotative adjustment of the adjusting member affects the braking action as in the other embodiments described. A stop 49 limits the rotative movement of the adjusting member.

The structure illustrated is provided with a line guide carriage 50, the traversing screw 51 of which is driven from the crank shaft through the gears 52 and 53—see Fig. 2.

From the above description, it will be apparent to those skilled in the art that I provide a brake or drag which is simple and economical in its parts and which may be readily adjusted. The mounting of the drag mechanism on the head and at the base of the crank not only makes it conveniently available for adjusting but also locates the drag so as to prevent undue strain on the parts.

I have illustrated and described my improvements in embodiments which I have found very practical. I have not attempted to illustrate or describe other embodiments or adaptations as it is believed this disclosure will enable those skilled in the art to embody or adapt my improvements as may be desired.

Although I have shown and described certain specific embodiments of my invention, I am fully aware that many modifications thereof are possible. My invention is therefore not to be restricted except insofar as is necessitated by the prior art and by the spirit of the appended claims.

Having thus described my invention, what I claim as new and desire to secure by Letters Patent, is:

1. In a fishing reel, the combination with a frame including a chambered head having an opening in its outer wall, a spool, a crank provided with a shaft disposed through said opening and having driving connection with said spool, a supporting spindle for said crank shaft on the inner wall of said head, an outwardly projecting collar mounted in said opening concentrically of said shaft and having an inwardly tapered internal portion and an external stop, a longitudinally slotted sleeve-like brake member having an inwardly tapered portion coacting with the inwardly tapered portion of said collar, the slots providing a plurality of segmental brake shoes uniformly positioned around and coacting with said crank shaft, and an adjusting member threaded upon said collar in supporting engagement with said brake member, said adjusting member being provided with a flange overhanging said collar and notched to provide spaced stops coacting with said stop on said collar.

2. In a fishing reel, the combination with a frame including a chambered head having an opening in its outer wall, a spool, a crank provided with a shaft disposed through said opening and having driving connection with said spool, a supporting spindle for said crank shaft on the inner wall of said head, an outwardly projecting collar mounted in said opening concentrically of said shaft and having an inwardly tapered internal portion, a longitudinally slotted sleeve-like brake member having an inwardly tapered portion coacting with the inwardly tapered portion of said collar, the slots providing a plurality of segmental brake shoes uniformly positioned around and coacting with said crank shaft, and an adjusting member threaded upon said collar in supporting engagement with said brake member.

3. In a fishing reel, the combination with a frame including a chambered head having an opening in its outer wall, a spool, a crank provided with a shaft disposed through said opening and having driving connection with said spool, a supporting spindle for said crank shaft on the inner wall of said head, an outwardly projecting collar mounted in said opening concentrically of said shaft and having an inwardly tapered internal portion, a longitudinally slotted sleeve-like brake member having an outwardly projecting flange at its outer end and an inwardly tapered portion coacting with the inwardly tapered portion of said collar, the slots providing a plurality of segmental brake shoes uniformly positioned around and coacting with said crank shaft, an adjusting member threaded upon said collar and having an inwardly projecting flange in supporting engagement with said flange on said brake member, and a retaining ring for said sleeve sprung into said adjusting member on the inner side of said brake member flange.

4. In a fishing reel, the combination with a frame, of a spool, a driving shaft having driving connection with said spool, a collar mounted on said frame concentrically of said shaft and having an inwardly tapered internal portion, a longitudinally slotted sleeve-like brake member having an outwardly projecting flange at its outer end and an inwardly tapered portion coacting with the inwardly tapered portion of said collar, the slots providing a plurality of segmental brake shoes uniformly positioned around and coacting with said crank shaft, and an adjusting member rotatable on said collar in supporting engagement with said brake member.

5. In a fishing reel, the combination with a frame, of a spool, a driving shaft having driving connection with said spool, a collar mounted on said frame concentrically of said shaft and having an inwardly tapered internal portion, a sleeve-like brake member having an inwardly tapered portion coacting with the inwardly tapered portion of said collar, and an adjusting member rotatable on said collar in supporting engagement with said brake member.

6. In a fishing reel, the combination with a frame, of a spool, a driving shaft having driving connection with said spool, a collar mounted on said frame concentrically of said shaft and having an inwardly tapered internal portion, a sleeve-like brake member having a flange at its outer end and an inwardly tapered portion coacting with the inwardly tapered portion of said collar, an adjusting member rotatable on said collar and having an inwardly projecting flange in supporting engagement with said flange on said brake member, and a retaining ring for said sleeve sprung into said adjusting member on the inner side of said brake member flange.

7. In a fishing reel, the combination with a frame and a spool, of a crank shaft operatively associated with said spool, a collar surrounding said crank shaft and provided with an internal conical portion, an adjusting member threaded upon said collar, said adjusting member and collar having coacting stops limiting the rotative movement of the adjusting member on the collar, an annular brake member disposed within said collar and adjusting member and provided with a plurality of segmental brake shoes operatively associated with said shaft and having inwardly inclined portions coacting with the conical portion of said collar whereby the brake shoes are adjusted by the rotative manipulation of said adjusting member, and a crank on said crank shaft disposed at the outside of said adjusting member.

8. In a fishing reel, the combination with a frame and a spool, of a crank shaft operatively associated with said spool, a collar surrounding said crank shaft, an adjusting member threaded upon said collar, an annular brake member disposed within said collar and adjusting member and provided with a plurality of segmental brake shoes operatively associated with said shaft and having portions coacting with said collar whereby the brake shoes are adjusted by the rotative manipulation of said adjusting member, and a crank on said crank shaft disposed at the outside of said adjusting member.

9. In a fishing reel, the combination with a frame and a spool, of a driving shaft operatively associated with said spool, a collar surrounding said driving shaft, an adjusting member threaded upon said collar, said adjusting member and collar having coacting stops limiting the rotative movement of the adjusting member on the collar, and a brake member disposed within said collar and operatively associated with said shaft and said adjusting member.

10. In a fishing reel, the combination with a frame and a spool, of a driving shaft operatively associated with said spool, a collar surrounding said driving shaft, an adjusting member threaded upon said collar, and a brake member disposed within said collar in coacting relation to said shaft and said adjusting member.

11. In a fishing reel, the combination with a frame comprising a head having spaced inner and outer walls, the outer wall having an opening, a crank shaft rotatably mounted in said inner wall and projecting through said opening, and a gear mounted on said shaft within said head, of a collar fixed to said outer wall in said opening and surrounding said crank shaft in spaced concentric relation, a brake adjusting member threaded to said collar, braking means for said gear and crank shaft housed within said collar and surrounding said crank shaft, the braking action of said means being controlled by turning said adjusting member, and stop means acting to limit the movement of said adjusting member and prevent the turning of the same off said collar.

12. In a fishing reel, the combination with a frame comprising a head having spaced inner and outer walls, the outer wall having an opening, a crank shaft rotatably mounted in said inner wall and projecting through said opening, and a gear mounted on said shaft within said head, of a collar fixed to said outer wall in said opening and surrounding said crank shaft in spaced concentric relation, a brake adjusting member threaded to said collar, braking means for said crank shaft housed within said collar and surrounding said crank shaft, and stop means acting to limit the movement of said adjusting member.

13. In a fishing reel, the combination with a frame, of a crank shaft, a collar fixed to said frame and surrounding said crank shaft in spaced relation, a brake adjusting member threaded to said collar, braking means for said crank shaft housed within said collar and surrounding said crank shaft, the braking action of said means being controlled by turning said adjusting member, and stop means acting to limit the movement of said adjusting member.

14. In a fishing reel, the combination with a frame, of a crank shaft, a collar fixed to said frame and surrounding said crank shaft in spaced relation, and braking means for said crank shaft housed within and coacting with said collar and surrounding and coacting with said crank shaft.

15. In a fishing reel, the combination with a frame, a crank shaft in said frame, of a collar fixed to said frame and surrounding said crank shaft in spaced relation, a brake adjusting member rotatable on said collar, braking means for said crank shaft housed within said collar and surrounding said crank shaft, the braking action of said means being controlled by turning said adjusting member, and stop means acting to limit the movement of said adjusting member.

16. In a fishing reel, the combination with a frame, a crank shaft in said frame, of a collar fixed to said frame and surrounding said crank shaft in spaced relation, a brake adjusting member rotatable on said collar, braking means for said crank shaft, the braking action of said means being controlled by turning said adjusting member, and stop means acting to limit the movement of said adjusting member.

17. In a fishing reel, the combination with a frame and a spool, of a driving shaft provided with a crank and operatively associated with said spool, a collar carried by said frame and surrounding said shaft, an annular brake member longitudinally slotted to provide a plurality of segmental brake shoes in coacting relation to said collar and operatively connected to said shaft, said brake member being provided with a conical shoulder, and a brake actuating member threaded upon said brake member and provided with an internal conical shoulder coacting with the shoulder of said brake member.

18. In a fishing reel, the combination with a frame and a spool, of a driving shaft provided with a crank and operatively associated with said spool, a collar carried by said frame and surrounding said shaft, an annular brake member longitudinally slotted to provide a plurality of segmental brake shoes in coacting relation to said collar and operatively connected to said shaft, and a brake actuating member rotatable upon said brake member.

19. In a fishing reel, the combination with a frame and a spool, of a crank shaft provided with a crank operatively associated with said spool, an annular brake member mounted on said frame and longitudinally slotted to provide a plurality of segmental brake shoes in coacting relation to said shaft, said brake member being provided with an external inclined shoulder, and a brake actuating member threaded upon said brake member and provided with an internal inclined shoulder coacting with said shoulder on said brake member.

20. In a fishing reel, the combination with a frame and a spool, of a crank shaft provided with a crank operatively associated with said spool, an annular brake member mounted on said frame and longitudinally slotted to provide a plurality of segmental brake shoes operatively associated with said shaft, and a brake actuating member rotatable upon said brake member.

21. In a fishing reel, the combination with a frame and a spool, of a driving shaft operatively associated with said spool and provided with a crank, a non-rotatable brake member in coacting relation to said shaft and disposed in concentric relation thereto, and a rotatable adjusting member for said brake member disposed concentrically of said shaft at the inner side of its crank.

22. In a fishing reel, the combination with a frame and a spool, of a driving shaft operatively associated with said spool, a collar mounted on said frame concentrically of said shaft, a brake member in coacting relation to said collar and with said shaft, and an actuating member for said brake member threaded upon said collar.

23. In a fishing reel, the combination with a frame and a spool, of a driving shaft operatively associated with said spool, a collar mounted on said frame concentrically of said shaft, a brake member in coacting relation to said collar and with said shaft, and an actuating member for said brake member disposed concentrically of said shaft at the inner side of its crank.

24. In a fishing reel, the combination with a frame and a spool, of a driving shaft operatively associated with said spool, a collar mounted on said frame concentrically of said shaft, a brake member in coacting relation to said collar and with said shaft, and a rotatable adjusting member disposed at the inner side of its crank, said brake being provided with a plurality of segmental shoes operatively associated with said shaft, and said brake and adjusting member being provided with coacting conical surfaces.

25. In a fishing reel, the combination with a frame and a spool, of a driving shaft operatively associated with said spool, a collar mounted on said frame concentrically of said shaft, a brake member in coacting relation to said collar and with said shaft, and a rotatable adjusting member disposed at the inner side of its crank, said brake being provided with a plurality of segmental shoes operatively associated with said shaft.

WILLIAM SHAKESPEARE, Jr.